(12) United States Patent
Yoneda

(10) Patent No.: US 11,433,532 B2
(45) Date of Patent: Sep. 6, 2022

(54) ROBOT JOINT STRUCTURE

(71) Applicant: FANUC CORPORATION, Yamanashi (JP)

(72) Inventor: Keishi Yoneda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 70 days.

(21) Appl. No.: 17/090,022

(22) Filed: Nov. 5, 2020

(65) Prior Publication Data

US 2021/0178574 A1 Jun. 17, 2021

(30) Foreign Application Priority Data

Dec. 12, 2019 (JP) .............................. JP2019-224657

(51) Int. Cl.
| | |
|---|---|
| *B25J 9/10* | (2006.01) |
| *F16H 1/20* | (2006.01) |
| *B25J 9/12* | (2006.01) |
| *B25J 19/00* | (2006.01) |

(52) U.S. Cl.
CPC .................. *B25J 9/102* (2013.01); *B25J 9/12* (2013.01); *B25J 19/0004* (2013.01); *F16H 1/20* (2013.01)

(58) Field of Classification Search
CPC ............................. B25J 19/0004; B25J 9/102
See application file for complete search history.

(56) References Cited

U.S. PATENT DOCUMENTS

| | | | | |
|---|---|---|---|---|
| 4,964,503 | A | * 10/1990 | Nishiyama | ............... B25J 9/104 248/661 |
| 6,068,442 | A | * 5/2000 | Flemmer | .................. B25J 9/042 901/29 |
| 2008/0056858 | A1* | 3/2008 | Tamura | .................... B25J 9/104 414/222.01 |
| 2014/0137687 | A1* | 5/2014 | Nogami | ................... B25J 18/00 901/23 |
| 2014/0224057 | A1* | 8/2014 | Tanaka | ................. B25J 17/0283 74/490.05 |
| 2015/0258681 | A1* | 9/2015 | Kinoshita | ............ B25J 19/0004 901/23 |

FOREIGN PATENT DOCUMENTS

| | | |
|---|---|---|
| JP | H11-077560 A | 3/1999 |
| JP | 2007-144559 A | 6/2007 |
| JP | 2019-097342 A | 6/2019 |

* cited by examiner

*Primary Examiner* — Jake Cook
(74) *Attorney, Agent, or Firm* — Maier & Maier, PLLC

(57) ABSTRACT

A robot joint structure includes a first member and a second member that are hollow, an actuator that rotates the second member about a fourth axis relative to the first member, and a brake mechanism capable of braking rotation of the second member relative to the first member. The actuator includes a motor accommodated within the first member, a speed reducer that reduces the speed of rotation of a motor shaft of the motor and that transmits the rotation to the second member, a first gear provided at the motor shaft, and a second gear provided in the speed reducer and engaged with the first gear. The brake mechanism includes a brake body accommodated within the first member, a brake shaft capable of being braked by the brake body, and a third gear provided at the brake shaft and engaged with the second gear.

2 Claims, 3 Drawing Sheets

ROBOT JOINT STRUCTURE

CROSS-REFERENCE TO RELATED APPLICATIONS

This application is based on Japanese Patent Application No. 2019-224657, the contents of which are incorporated herein by reference.

FIELD

The present disclosure relates to robot joint structures.

BACKGROUND

A known robot joint structure includes a first arm and a second arm that is rotatable about a rotation axis relative to the first arm. A driving force of a motor fixed in an accommodated state within the first arm is transmitted to the second arm via a plurality of gears and a speed reducer (e.g., see Japanese Unexamined Patent Application, Publication No. 2007-144559).

The motor used in the robot joint structure is normally equipped with a brake for preventing the arms from rotating in accordance with gravity when the power of the robot is turned off.

SUMMARY

An aspect of the present disclosure provides a robot joint structure including a first member and a second member that are configured to hollow, an actuator that rotates the second member about a rotation axis relative to the first member, and a brake mechanism capable of braking rotation of the second member relative to the first member. The actuator includes a motor accommodated within the first member and not having a brake, a speed reducer that reduces the speed of rotation of a motor shaft of the motor and that transmits the rotation to the second member, a first gear provided at the motor shaft, and a second gear provided in the speed reducer and engaged with the first gear. The brake mechanism includes a brake body accommodated within the first member, a brake shaft capable of being braked by the brake body, and a third gear provided at the brake shaft and engaged with the second gear.

DETAILED DESCRIPTION OF EMBODIMENTS

A robot joint structure 1 according to an embodiment of the present disclosure will be described below with reference to the drawings.

Figure 1:
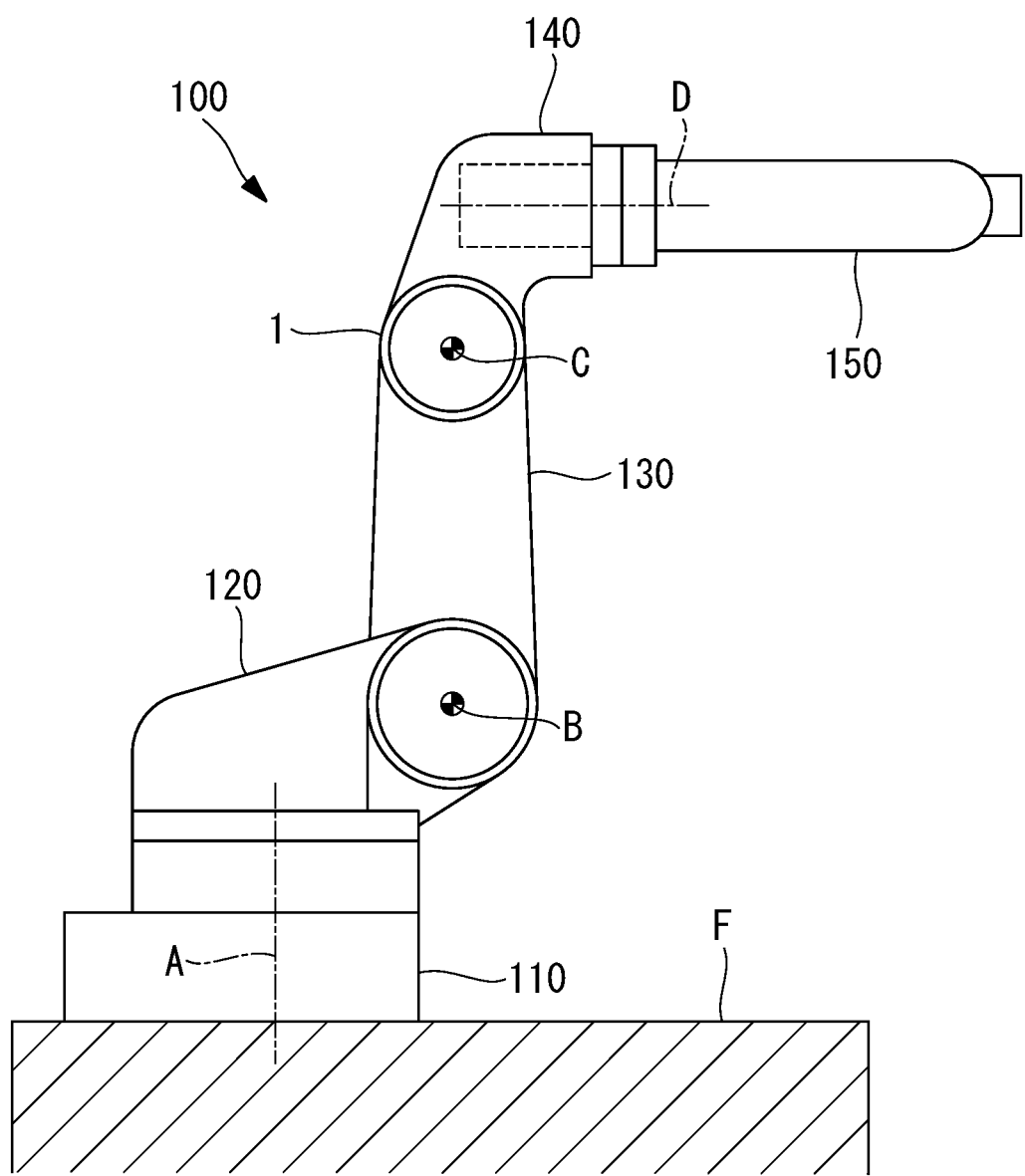
FIG. 1 schematically illustrates an example of a robot equipped with a joint structure according to an embodiment of the present disclosure.

As shown in FIG. 1, a robot 100 equipped with the joint structure 1 according to this embodiment is, for example, a vertical six-axis articulated robot. The robot 100 includes a base 110 set on a floor surface F, and also includes a rotating body 120 supported in a rotatable manner about a first axis A, which is vertical, relative to the base 110.

The robot 100 includes a first arm 130 supported in a rotatable manner about a second axis B, which is horizontal, relative to the rotating body 120, and also includes a second arm (first member) 140 that is hollow and is supported about a third axis C, which is horizontal, relative to the first arm 130. The robot 100 further includes a hollow wrist unit (second member) 150 supported in a rotatable manner relative to the second arm 140 about a fourth axis D, which is in a skew positional relationship with the third axis C.

Figure 2:
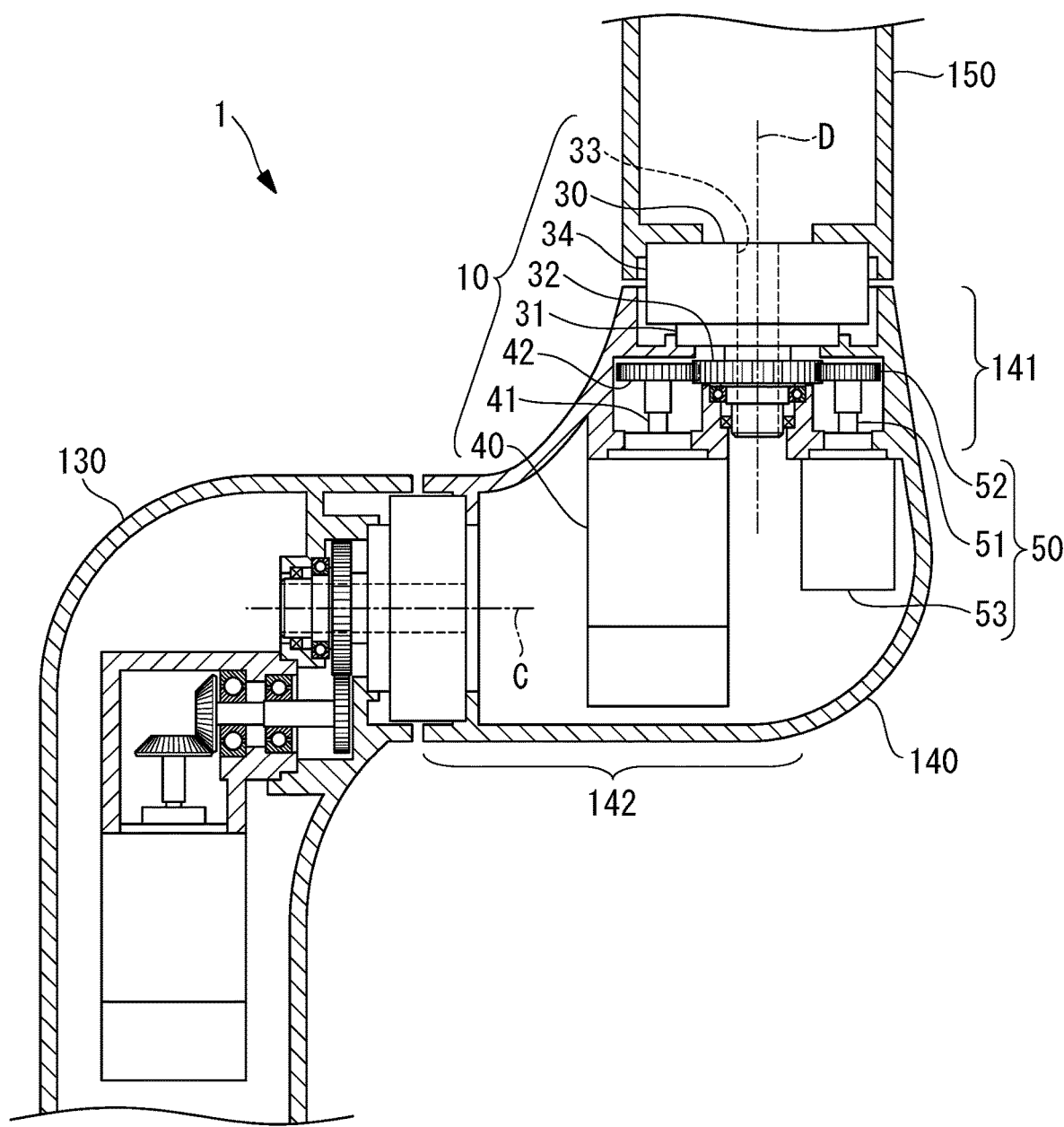
FIG. 2 is a partially enlarged view illustrating the joint structure in FIG. 1.

For example, as shown in FIG. 2, the joint structure 1 according to this embodiment is disposed between the second arm 140 and the wrist unit 150. The joint structure 1 includes the second arm 140, the wrist unit 150, an actuator 10 that rotationally drives the wrist unit 150 about the fourth axis D relative to the second arm 140, and a brake mechanism 50 that brakes the wrist unit 150 relative to the second arm 140.

The actuator 10 includes a speed reducer 30 and a motor 40. The speed reducer 30 includes an input shaft 31 fixed to the second arm 140, and also includes an output shaft 34 that is supported in a rotatable manner about the fourth axis D relative to the input shaft 31 and that is fixed to the wrist unit 150.

The speed reducer 30 includes a hollow section 33 extending along the fourth axis D at a position including the fourth axis D. The speed reducer 30 includes a second gear 32 located at the second arm 140 side of the input shaft 31 and supported in a rotatable manner about the fourth axis D relative to the input shaft 31.

The second gear 32 has a ring shape with a center hole 35 that spatially communicates with the hollow section 33. Thus, the internal space of the second arm 140 spatially communicates with the internal space of the wrist unit 150 through the hollow section 33 and the center hole 35.

The motor 40 is fixed to the second arm 140 in a state where the motor 40 is accommodated within the second arm 140. The motor 40 includes a motor shaft 41 that extends in the axial direction. A first gear 42 is fixed to the motor shaft 41.

Figure 3:
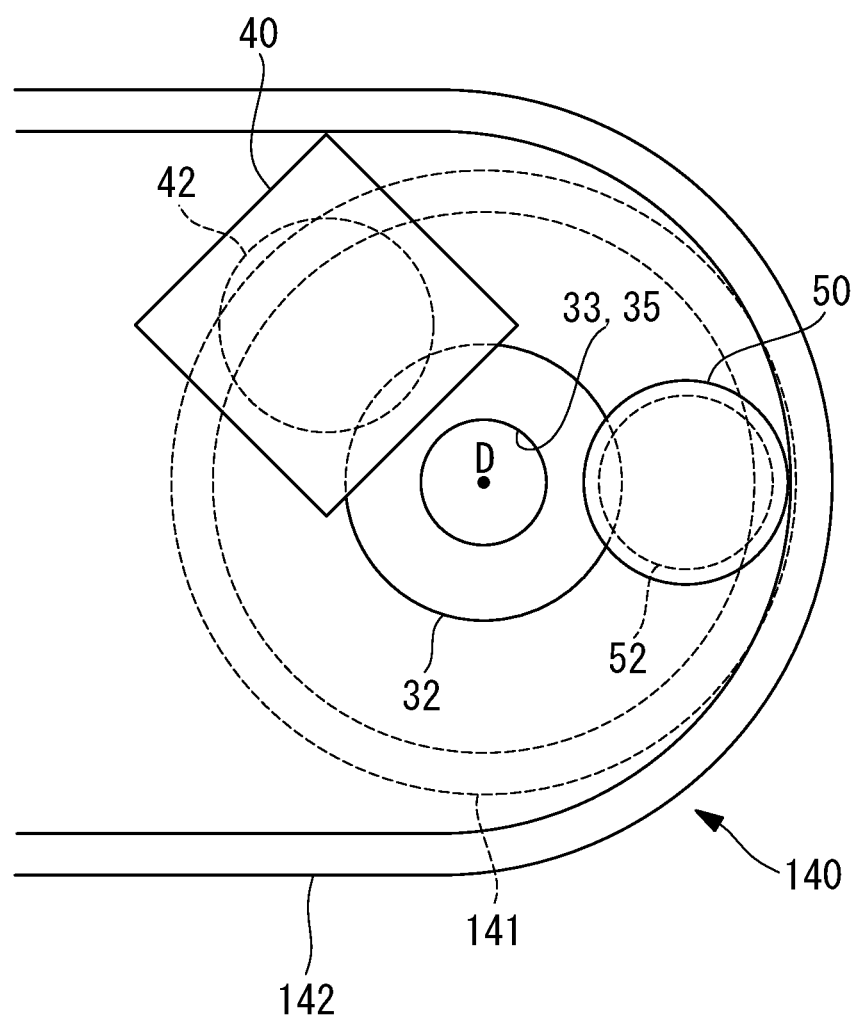
FIG. 3 schematically illustrates the arrangement of components in the joint structure in FIG. 1.

As shown in FIG. 3, the motor 40 is fixed to the second arm 140 at a position offset radially outward from the fourth axis D to avoid overlap with the hollow section 33 and the center hole 35. The first gear 42 fixed to the motor shaft 41 is engaged with the second gear 32 of the speed reducer 30.

Accordingly, rotation of the motor shaft 41 of the motor 40 is transmitted to the speed reducer 30 via the engagement between the first gear 42 and the second gear 32, is reduced in speed within the speed reducer 30, and is output as rotation of the output shaft 34 of the speed reducer 30.

The brake mechanism 50 is accommodated within the second arm 140 and includes a brake body 53 fixed to the second arm 140 and a brake shaft 51 supported in a rotatable manner relative to the brake body 53. A third gear 52 engaged with the second gear 32 is fixed to the brake shaft 51.

As shown in FIG. 3, the brake mechanism 50 is also fixed to the second arm 140 at a position offset radially outward from the fourth axis D to avoid overlap with the hollow section 33 and the center hole 35. The motor 40 and the brake mechanism 50 are disposed at different positions set apart from each other in the circumferential direction around the fourth axis D.

The operation of the joint structure 1 according to this embodiment having the above-described configuration will be described below.

In the joint structure 1 according to this embodiment, when the motor shaft 41 of the motor 40 is rotated, the rotation of the motor shaft 41 is transmitted to the speed reducer 30 via the engagement between the first gear 42 and the second gear 32, so that the wrist unit 150 is rotated about the fourth axis D relative to the second arm 140.

Because the third gear 52 is also engaged with the second gear 32 at the same time, the brake shaft 51 is rotated via the third gear 52 when the second gear 32 rotates. Therefore, when the brake body 53 is actuated, the brake shaft 51 is stopped from rotating, and a braking force is transmitted to the speed reducer 30 via the engagement between the second gear 32 and the third gear 52. Accordingly, the wrist unit 150 can be maintained in a stationary state relative to the second arm 140.

In this case, in the joint structure 1 according to this embodiment, the motor 40 and the brake mechanism 50 are separated from each other and are disposed at different positions in the circumferential direction around the fourth axis D, so that the height of the motor 40 in the axial direction can be reduced and distributed, as compared with a brake-equipped motor. This is advantageous in that the internal space of the second arm 140 can be minimized, and that the outer dimensions of the second arm 140 can be reduced.

In the joint structure 1 according to this embodiment, the motor 40 and the brake mechanism 50 are disposed at offset positions where they do not overlap with the hollow section 33 of the speed reducer 30 and the center hole 35 in the second gear 32. Accordingly, a wiring member (not shown) can be routed from the second arm 140 to the wrist unit 150 through the hollow section 33 and the center hole 35.

As shown in FIG. 2 and FIG. 3, the joint structure 1 according to this embodiment is provided with a first section 141 extending along the fourth axis D and a second section 142 bending in one direction relative to the first section 141 and extending in a direction intersecting the fourth axis D. Accordingly, the second arm 140 has a shape of the letter L obtained by connecting the first section 141, which is cylindrical, and the second section 142, which is cylindrical, with a bent section.

With regard to the internal space of the second arm 140 having this structure, the space within the first section 141 widens in one direction at the bent section. In this embodiment, this widened shape within the bent section is utilized to dispose the motor 40 in a position across both sides of a surface extended from the outer surface of the first section 141 along the fourth axis D.

Accordingly, even with the motor 40 being offset significantly to a position where it does not overlap with the hollow section 33 and the center hole 35, the outer dimensions of the second arm 140 do not need to be increased. This is advantageous in that further compactness can be achieved.

Specifically, by effectively utilizing the internal space in the bent section of the second arm 140, the outer diameter of the first section 141 of the second arm 140 around the fourth axis D can be reduced.

Furthermore, the outer diameter of the wrist unit 150, supported in a rotatable manner about the fourth axis D relative to the second arm 140, around the fourth axis D can also be reduced. This is advantageous in that the entire robot 100 can be reduced in size and weight.

This embodiment is based on the assumption that the motor 40 and the brake mechanism 50 are separated from each other to prevent an increase in size of the second arm 140. Alternatively, the advantage of reducing the outer dimensions of the first section 141 of the second arm 140 by disposing the motor by utilizing the shape of the internal space in the bent section of the second arm 140 can also be achieved by employing a brake-equipped motor as the motor.

The invention claimed is:

1. A robot joint structure comprising:
a first member and a second member that are hollow;
an actuator that rotates the second member about a rotation axis relative to the first member; and
a brake mechanism capable of braking rotation of the second member relative to the first member,
wherein the actuator includes a motor accommodated within the first member and not having a brake, a speed reducer that reduces the speed of rotation of a motor shaft of the motor and that transmits the rotation to the second member, a first gear provided at the motor shaft, and
a second gear provided in the speed reducer and engaged with the first gear, and
the brake mechanism includes a brake body accommodated within the first member, a brake shaft capable of being braked by the brake body, and a third gear provided at the brake shaft and engaged with the second gear,
wherein the first member includes a first section extending along the rotation axis, a second section extending in a direction intersecting the rotation axis, and a bent section provided between the first section and the second section, and,
in a bent space of the bent section, the motor is disposed along the rotation axis.

2. The robot joint structure according to claim 1,
wherein the speed reducer includes a hollow section including the rotation axis and extends through the speed reducer along the rotation axis,
the second gear is supported in a rotatable manner about the rotation axis and has a ring shape with a center hole, and
the first gear and the third gear are supported in a rotatable manner about axes that are parallel to the rotation axis and that are set apart from each other in a circumferential direction.

* * * * *